United States Patent
Kim et al.

(10) Patent No.: US 7,359,988 B2
(45) Date of Patent: *Apr. 15, 2008

(54) SUBNET OF POWER LINE COMMUNICATION NETWORK, METHOD FOR SETTING UP THE SAME, ELECTRONIC APPLIANCE CONNECTED TO THE SAME, AND COMMUNICATION MODULE USED IN ELECTRONIC APPLIANCE

(75) Inventors: Chul Kim, Namyangju (KR); Chung Ha Park, Inchon-kwangyok (KR)

(73) Assignee: LG Electronics Inc., Seoul (KR)

( * ) Notice: Subject to any disclaimer, the term of this patent is extended or adjusted under 35 U.S.C. 154(b) by 938 days.

This patent is subject to a terminal disclaimer.

(21) Appl. No.: 10/244,431

(22) Filed: Sep. 17, 2002

(65) Prior Publication Data

US 2003/0055922 A1    Mar. 20, 2003

(30) Foreign Application Priority Data

Sep. 17, 2001   (KR)   ............................. 2001-57314

(51) Int. Cl.
   *G06F 15/16*   (2006.01)
   *G06F 15/173*  (2006.01)
   *G06F 15/177*  (2006.01)
   *H04L 12/56*   (2006.01)

(52) U.S. Cl. .................... 709/245; 709/220; 709/221; 709/222; 709/223; 709/224; 709/225; 709/226; 340/2.23; 370/389; 370/427

(58) Field of Classification Search ..................... None
See application file for complete search history.

(56) References Cited

U.S. PATENT DOCUMENTS 5,724,510 A * 3/1998 Arndt et al. ................. 709/220
6,272,551 B1   8/2001 Martin et al.
6,959,009 B2 * 10/2005 Asokan et al. ............... 709/219
7,035,941 B2 *  4/2006 Shirai et al. ................. 709/245
2001/0017857 A1 * 8/2001 Matsukawa .................. 370/392
2002/0000792 A1   1/2002 Hanaki ........................ 323/234
2002/0011923 A1 * 1/2002 Cunningham et al. . 340/310.01
2002/0169914 A1  11/2002 Shteyn
2003/0001721 A1 * 1/2003 Daum et al. ................. 340/5.8
2003/0109938 A1 * 6/2003 Daum et al. .................. 700/11

FOREIGN PATENT DOCUMENTS

JP        2001308909 A  * 11/2001
WO        WO 01/65703 A2   9/2001
WO        WO 01/82550 A2  11/2001

OTHER PUBLICATIONS

International Search Report; Austrian Patent Office, Aug. 12, 2003.

* cited by examiner

*Primary Examiner*—John Follansbee
*Assistant Examiner*—Hassan Phillips
(74) *Attorney, Agent, or Firm*—McKenna Long & Aldridge LLP (57) ABSTRACT

A communication network for detecting and regulating identifier overlap generated after subnet is created includes a communication module including a starting means for starting a subnet creation sequence; identifier generating means for generating at least two type of identifiers; a transceiver for broadcasting an identifier hail signal including at least two types of identifiers over a communication network; comparing means for comparing at least two types of identifiers included in the identifier hail signal with corresponding identifiers identifying its home subnet; identifier setup means for generating the identifiers acknowledged as unique among subnets existing within an open communication range; and an identifier storing means for storing generated identifiers. The transceiver broadcasts a non-acknowledgement signal over the communication network when identifiers in the identifier hail signal are identical to identifiers of its subnet, the identifier generating means generates at least two types of identifiers when the transceiver receives the non-acknowledgement signal.

23 Claims, 8 Drawing Sheets

SUBNET OF POWER LINE COMMUNICATION NETWORK, METHOD FOR SETTING UP THE SAME, ELECTRONIC APPLIANCE CONNECTED TO THE SAME, AND COMMUNICATION MODULE USED IN ELECTRONIC APPLIANCE

This application claims the benefit of Korean Patent Application No. 2001-57314, filed on Sep. 17, 2001, which is hereby incorporated by reference for all purposes as if fully set forth herein.

BACKGROUND OF THE INVENTION

1. Field of the Invention

The present invention relates to a communication network using an open communication medium. More particularly, the present invention relates to a communication network capable of detecting and regulating home code overlap generated after subnet setup in its early stage.

2. Discussion of the Related Art

Open communication mediums are communication mediums that are not only distributed within a predetermined control range, but also extend outside the predetermined control range. Accordingly, open communication mediums (e.g., a power lines) enable nodes within a predetermined control range to communicate with other node outside the predetermined control range.

Subnets (e.g., home networks) are portions of communication networks and comprise nodes (e.g., electronic appliances) that may communicate with each other via the aforementioned open communication medium. Generally, electronic appliances have a specific control range and may communicate with other electronic appliances within their specific control range via power lines found within a home network.

Communication between electronic appliances within a home network via power lines (i.e., power line networking) has been widely supported primarily because power line networking does not require extra communications mediums.

Power line networking requires electronic appliances within the specific control range transmit and receive data packets through power lines using a transceiver (e.g., a carrier-current transceiver). Further, power line networking requires the electronic appliances to be connected to an external communication network, such as the Internet, through a gateway.

Power lines within a home network do not constitute a closed distribution network within the specific control range but, rather, constitute an open distribution network (i.e., a network that branches from a power transmission site to each house network). Typically, data packets are transmitted between electronic appliances within open networks by employing broadcasting methods (i.e., transmission methods not using routers). Accordingly, data packets broadcasted by one electronic appliance within the specific control range are transmitted not only to other electronic appliances within the specific control range of the home network, but are also transmitted to electronic appliances existing outside the specific control range. Accordingly, open networks enable data packets transmitted from an electronic appliance in one house to be broadcasted to electronic appliances in other houses that are connected to the same power transmission site. One undesirable consequence of broadcasting within an open network occurs, however, when an electronic appliance located outside of a transmitting home network receives a command or other information within the broadcasted data packet in that the receiving appliance typically fails to function properly.

One method, proposed in order to solve the aforementioned problem, involves the installation of a blocking filter on a power line between the power transmission site and the home network. In theory, a blocking filter so installed could prevent data packets from being broadcasted to electronic appliances outside the transmitting home network. However, installing such a blocking filter is a relatively expensive solution to the aforementioned problem and it is often difficult to determine where an appropriate installation location exists. Moreover, information within data packets may still be leaked through other lines such as telephone lines, and the blocking filter may be improperly operated.

Data packets transmitted by electronic appliances found within home networks may include identifiers called home codes. Electronic appliances may selectively receive the transmitted data packets based on the identifier. For example, electronic appliances within the same home network must have the same identifier. Selection of a suitable identifier is essential to enable electronic appliances within a home network to communicate with each, according to their specific control range.

Methods for selecting a suitable identifier typically use hardware operating means, e.g., a dip switch. Using the hardware operating means, the identifier is selected by operating the dip switch prior to connecting the electronic appliance to a power line. As operating a dip switch may be difficult, an on-site service is usually provided by representatives of the electronic appliance companies wherein the representative confirms and adjusts the identifier for use within a particular home network. A problem still exists, however, that there is no proper method for detecting when an identifier selected in a first home network is identical to an identifier selected in a second home network, connected to the first home network by a power transmission site.

In order to solve the foregoing problem, the inventors of the present invention have disclosed "Power Line Communication Device Having Plug and Play Function" (non laid-open Korea patent application 10-2001-0011846, applied for registration on Mar. 7, 2001). The communication device disclosed in the non laid-open patent application includes a home code management module for managing a home code identifier that is uniformly provided to nodes existing within a specific control range among a plurality of nodes that are connected to a power line; an area code setup module for creating an area code identifier that is uniformly provided to nodes in the same area after the nodes existing within the control range are classified according to areas in which they exist; a group code setup module for creating a group code identifier that is uniformly provided to nodes of the same group by grouping the nodes existing within the control range according to predetermined correlations; and a device code management module for managing a device code identifier that is uniformly provided to each node. When power is connected to the respective nodes, the aforementioned modules automatically create a home code and an address to the nodes by broadcasting an identifier hail signal and receiving a response. While the aforementioned communication device solves problems related to dip switch operation, an algorithm used to detect and regulate home code overlap before generation of the home code is complicated.

SUMMARY OF THE INVENTION

Accordingly, the present invention is directed to a subnet of a communication network, a method for creating the subnet, a node (e.g., an electronic appliance) connected to the subnet, and a communication module used in the node that substantially obviate one or more problems due to limitations and disadvantages of the related art.

The present invention provides a subnet connected to a communication network via an open communication medium, a node connected to the subnet, and a communication module used in a node of the subnet.

The preset invention also provides a method wherein a node on the communication network creates the subnet.

An advantage of the present invention provides a method for automatically creating a subnet without causing interferences between other subnets existing within a control range (i.e., 'open communication range') of a data packet that is transmitted through an open communication medium such as a power line.

Another advantage of the present invention is to provide communication regulations that detect and regulate home code overlap prior to creation of a home code after the subnet setup.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a subnet includes at least one node having a transceiver for transmitting and receiving data via an open communication medium.

In another aspect of the present invention, a method is provided wherein a node connected to the open communication medium creates a subnet separate from the other created subnets existing within an open communication range.

Accordingly, the node includes a starting means for starting a subnet creation sequence. The starting means may, for example, include an automatically executable program that is activated when the node is first powered on. Accordingly, the node includes a resetting means for resetting the program and re-starting the subnet creation sequence after the subnet initially created. The resetting means may, for example, include a switch.

The node may include an identifier generating means for generating at least two types of identifiers upon initiation of the subnet creation sequence. A first identifier type includes a home code and a second identifier type includes a unique home ID associated with that subnet.

The transceiver may broadcast an identifier hail signal including the generated identifiers to confirm whether the generated identifiers are identical to identifiers generated by other created subnets existing within the open communication range.

Accordingly, each node may include a comparing means for comparing the identifiers included in the broadcasted identifier hail signal with identifiers specific to the receiving subnet. When the identifiers included in the identifier hail signal are different from the identifiers of the receiving subnet, the node within the receiving subnet (i.e., the receiving node) becomes non-responsive to the broadcasted identifier hail signal. When any of the identifiers within the broadcasted identifier hail signal are identical to the identifiers of the receiving subnet, the receiving node transmits a non-acknowledgement signal through its transceiver.

When the node broadcasting the identifier hail signal receives the transmitted non-acknowledgement signal, it generates new identifiers and broadcasts the identifier hail signal including the new identifiers. When the broadcasting node does not receive a non-acknowledgement signal for a predetermined amount of time, the broadcasting node considers that the identifiers have been acknowledged by nodes in all receiving subnets existing within the open communication range and uses the newly generated identifiers as identifiers of its subnet. In another aspect of the present invention, the transceiver includes a subnet identifying means for identifying the subnet to which the node broadcasting the data packet belongs according to at least one of the two types of identifiers received within the broadcasted data packet.

The method for setting up a subnet may include the steps of starting a subnet creation sequence, generating at least two types of identifiers, storing the at least two generated identifiers as temporary identifiers for identifying the newly created subnet, broadcasting an identifier hail signal including at least two types of temporary identifiers over an open communication network, determining whether a non-acknowledgement signal, responsive to the identifier hail signal, has been received after a predetermined amount of time, repeating the steps from the step for generating and storing the identifiers every time a non-acknowledgement signal is received, and storing the temporary identifiers as formal identifiers when the non-acknowledgement signal has not been received for the predetermined amount of time in the determining step, wherein the formal identifiers identify the newly created subnet.

In another aspect of the present invention, a method is provided for preventing the creation of a subnet having the same identifier as an existing subnet, wherein a node of any subnet is identified on a communication network using an open communication medium by at least two types of identifiers. The method includes a first determining step for determining whether a received data packet includes a broadcasted identifier hail signal and a second determining step for determining whether any of identifiers included within the broadcasted identifier hail signal are identical to the identifiers of the receiving subnet. In the second determining step, the method may further include a step of broadcasting a non-acknowledgement signal when any of the received identifiers are identical to the identifiers of the receiving subnet. When the identifiers included in the broadcasted identifier hail signal are different from the identifiers of the receiving subnet, the receiving node maintains a non-responsive state.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
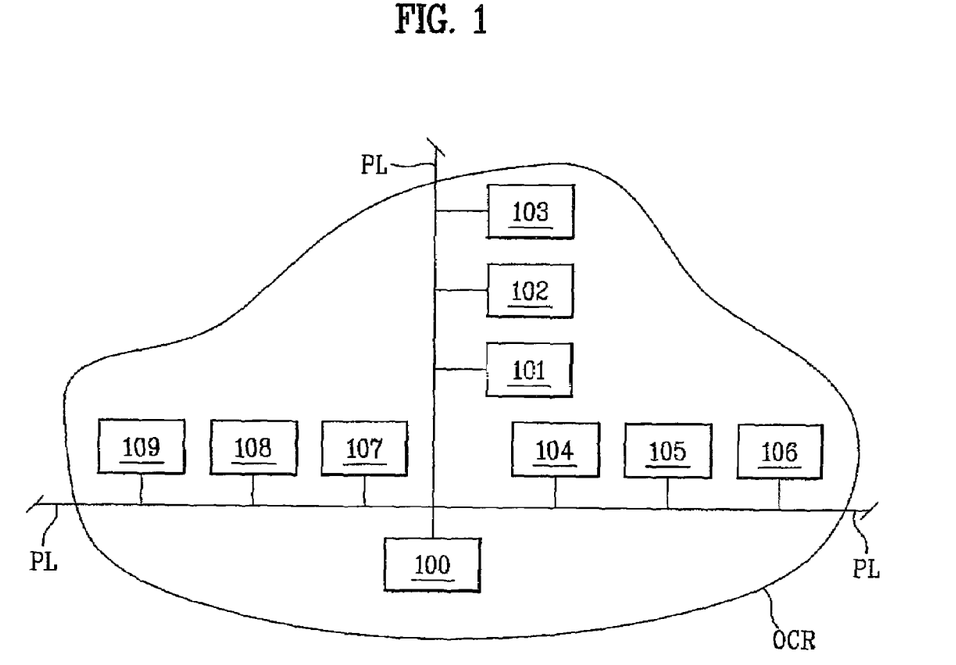
FIG. 1 illustrates a schematic block diagram of a power line communication network in accordance with the principles of the present invention.

FIG. 1 illustrates a schematic block diagram of a power line communication network in accordance with the principles of the present invention.

According to the principles of the present invention, a plurality of electronic appliances (i.e., nodes) connected to a power line (i.e., communication medium) each located within one of plurality of home networks (i.e., subnets) create a communication network.

Referring to FIG. 1, reference numerals 100 to 109 represent a plurality of individual subnets connected a communication network via common power lines, PL. Subnets 100-109 are located on the communication network within a range allowing data packets broadcasted from one subnet to be received by another subnet. Thus, subnets 100-109 exist within an open distribution network and the communication range within which the data packets may be broadcasted to other subnets may be referred to as the open communication range (OCR).

Figure 2:
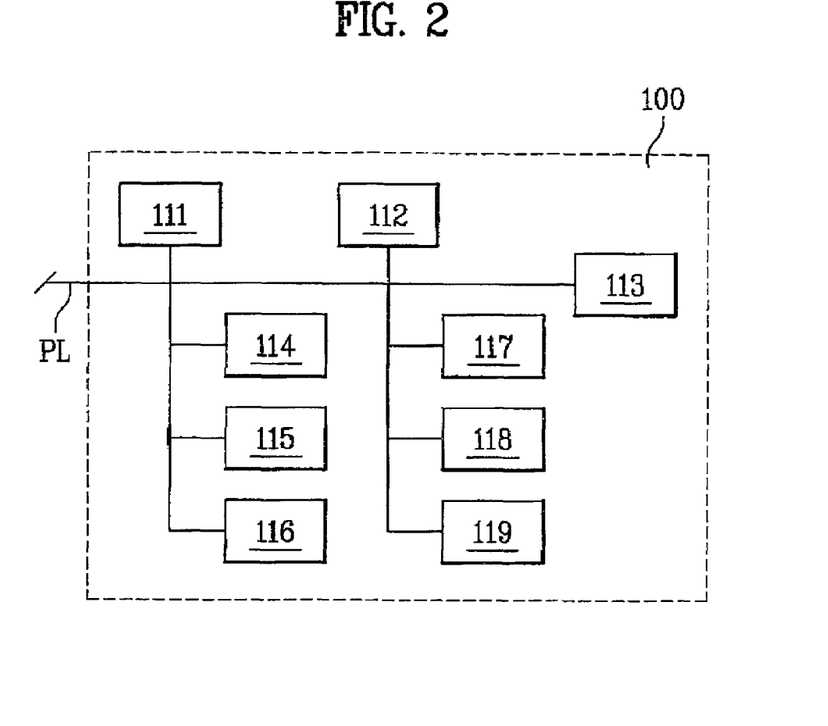
FIG. 2 illustrates a schematic block diagram of a subnet within the communication network shown in FIG. 1.

FIG. 2 illustrates a schematic block diagram of a subnet within the communication network shown in FIG. 1.

Referring to FIG. 2, reference numerals 111 to 119 denote individual nodes within, for example, subnet 100. In one aspect of the present invention, nodes 111-119 may include appliances found within a particular network and capable of receiving power from an indoor power supply. When subnet 100 is created within, for example, a house, nodes 111-119 may include electronic appliances such as a computer, refrigerator, heater, kitchen utensil, or any other electronic appliance designed for use within a kitchen. When subnet is created within, for example, an office, nodes 111-119 may include electronic devices such as a computer, stereo, television, paper shredder, or any other electronic appliance designed for use within an office.

Figure 3:
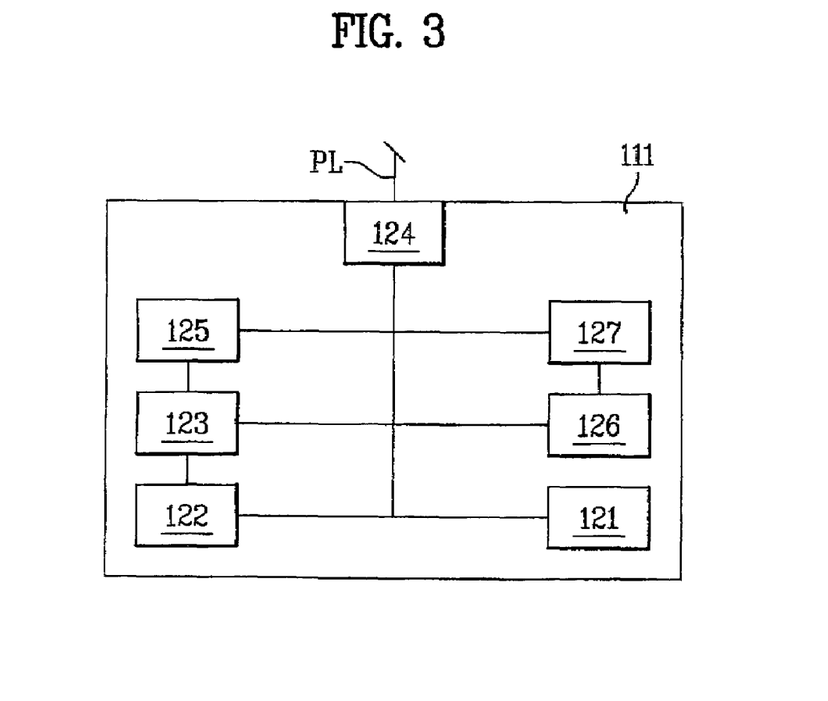
FIG. 3 illustrates a functional block diagram of components within a communication device within the nodes of the subnet shown in FIG. 2.
Figure 4:
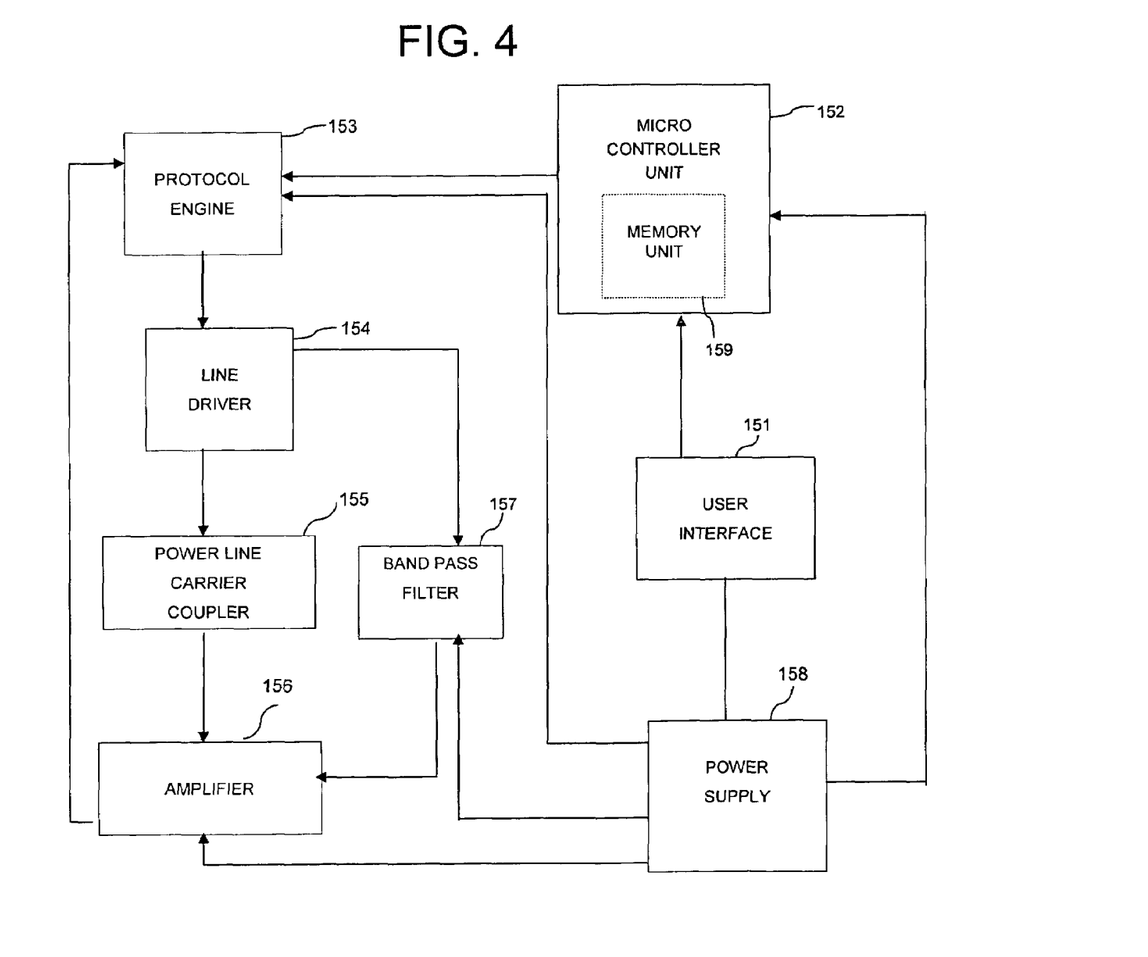
FIG. 4 illustrates a block diagram of components used within a communication module included within the communication device shown in FIG. 3.
Figure 5:
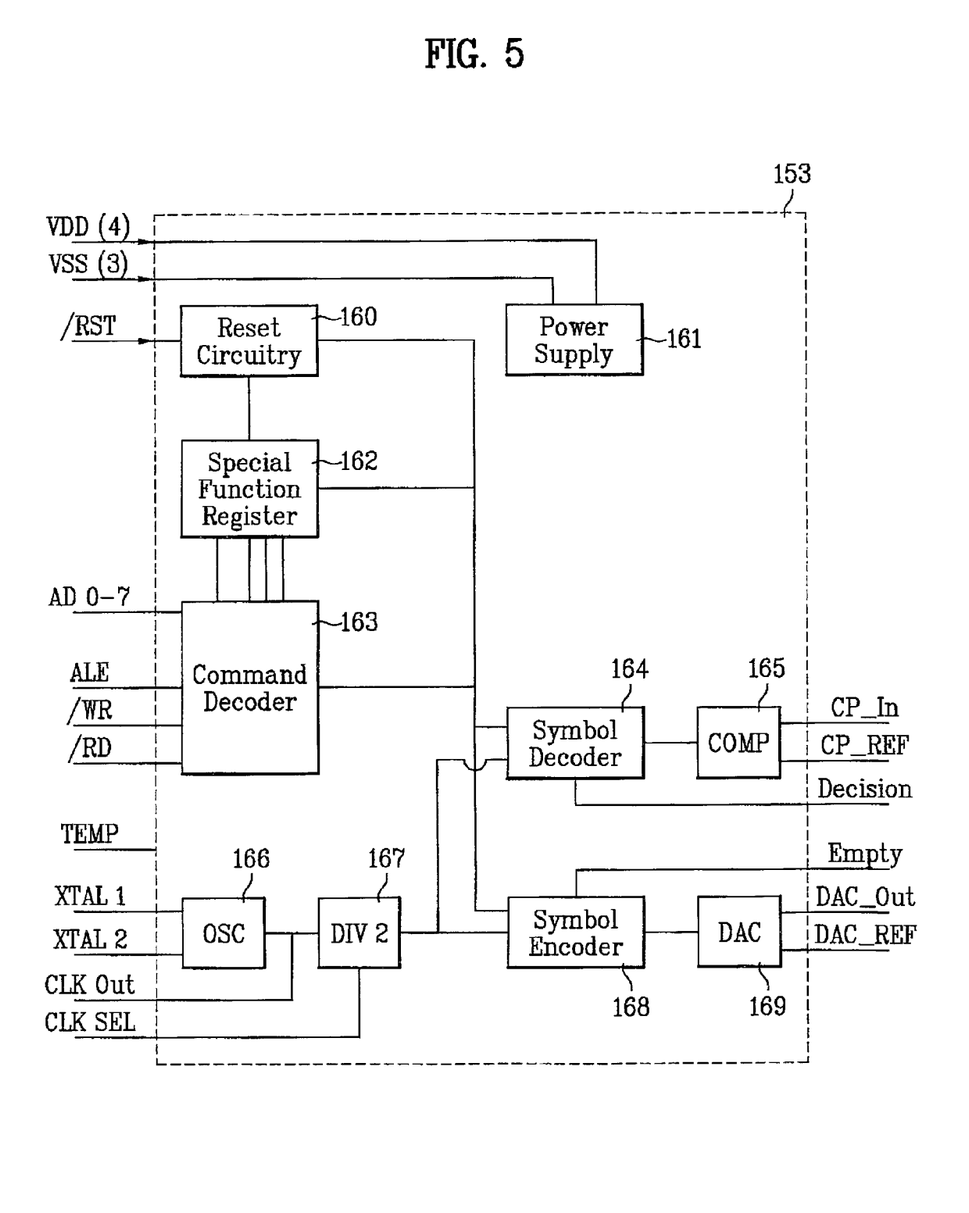
FIG. 5 illustrates a block diagram of components within a protocol engine of the communication module shown in FIG. 4.

FIG. 3 illustrates a functional block diagram of components with a communication device within a representative node among nodes of the subnet shown in FIG. 2 for communicating in accordance with the present invention. FIG. 4 illustrates a block diagram of components used within a communication module included within the communication device shown in FIG. 3. FIG. 5 illustrates a detailed block diagram of a protocol engine used within the communication module shown in FIG. 4.

Referring to FIG. 3, each node includes a communication device. Accordingly, each communication device may, for example, include a microprocessor 121 for controlling the execution of a communication control program such as that shown in the sequence map and flowchart of FIGS. 8 and 9; a starting means 122 for starting a subnet creation sequence; an identifier generating means 123 for generating at least two types of identifiers used to identify its home subnet; a transceiver 124 for broadcasting an identifier hail signal including at least the two types of identifiers over the communication network; a comparing means 125 for comparing the at least two types of identifiers included in a broadcasted identifier hail signal to stored identifiers in order to identify the subnet broadcasting the identifier hail signal (i.e., the broadcasting subnet); an identifier setup means 126 for generating identifiers acknowledged as unique by nodes of outside subnets on the communication network; and an identifier storing means 127 for storing generated identifiers.

Referring to FIG. 4, a communication module embodied as the communication device shown in FIG. 3 processes transmitted/received data packets and includes a protocol engine (e.g., ZCT-2096) 153, a line driver 154 for receiving a signal from the protocol engine 153 and for outputting the signal to be transmitted through a power line, a power line carrier coupler 155 for transmitting the signal from the line driver 154 to the power line, and a receiving amplifier 156 for amplifying the signal from the power line and transmitting it to the protocol engine 153. In one aspect of the present invention, some of the signals transmitted from the line driver 154 to the power line carrier coupler 155 may be transmitted to the receiving amplifier 156 through a bandpass filter 157. The operation of the protocol engine 153 may be controlled by a micro controller unit 152 for executing a logic control program. The micro controller unit 152 may include a memory unit 159 that stores a control input value inputted through a user interface 151 or transmitted/received data packets or may be used as a communication buffer. Power supply 158 provides driving power suitable for operating the components within the communication device. In one aspect of the present invention, user interface 151 and the micro controller unit 152 communicate with each other using, for example, an RS232 connection. Devices and components of appropriate specifications may easily be purchased and combined to form the aforementioned components of the communication device except for the protocol engine 153.

FIG. 5 illustrates a block diagram of components within a protocol engine of the communication module shown in FIG. 4.

Referring to FIG. 5, the protocol engine 153 may include a special function register 162 provided for storing generated identifiers; a comparator 165 provided for comparing information included in received signals with corresponding comparison reference values; a symbol decoder 164 provided for outputting a decision value according to the comparison result of the comparator 165; a symbol encoder 168 for encoding data to be transmitted through the power line; a digital to analog converter 169 provided for converting output from the symbol encoder 168; a divider 167 provided for dividing a clock signal from an oscillator 166 and for outputting the clock signal according to a clock select value and providing the clock signal to the symbol encoder 168; reset circuitry 160 provided for resetting previously generated identifier values stored in the special function register 162; a command decoder 163 provided for controlling the operation of the various components of the protocol engine 153; and a power supply 161 provided for supplying power to the protocol engine 153.

When the communication device of the appliance used as the node is manufactured in form of the communication module of FIGS. 4 and 5, the function of the microprocessor 121 illustrated in FIG. 3 is performed by micro controller unit 152, the micro controller unit 152 determines processing of the received data according to the decision value of the symbol decoder 164 and the comparator 165, and the special function register 162 stores a setup value of the data to be compared by the comparator 165. The function of starting means 122 is performed either via interaction with a user through the user interface 151 or via the logic control program executed by the micro controller unit 152.

A process by which, for example, node 111 shown in FIG. 3, creates subnet 100 will now be described with reference to FIGS. 6 through 9.

Figure 6:
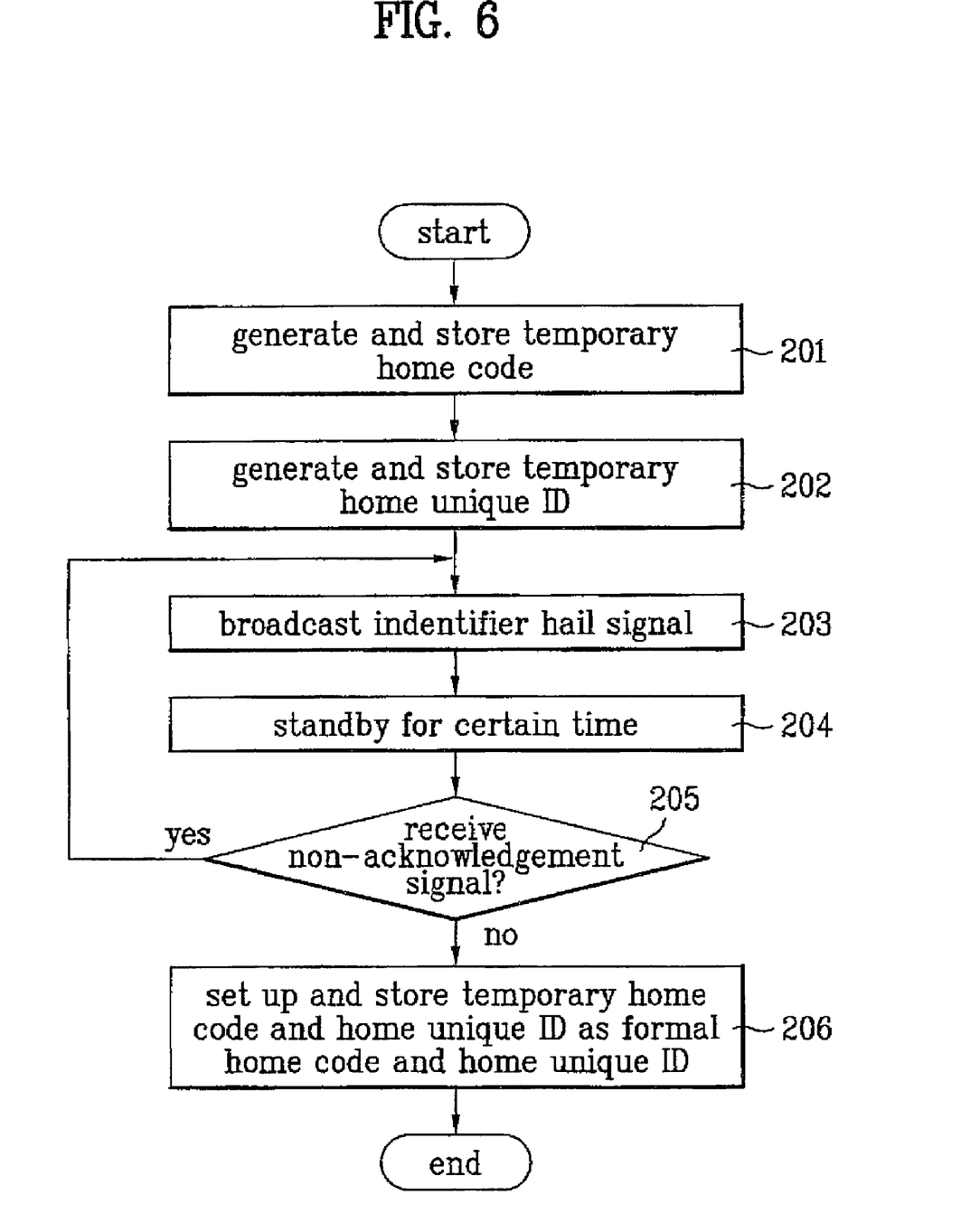
FIG. 6 illustrates a process flowchart by which the node shown in FIG. 3 sets up a subnet on the communication network shown in FIG. 1.
Figure 7:
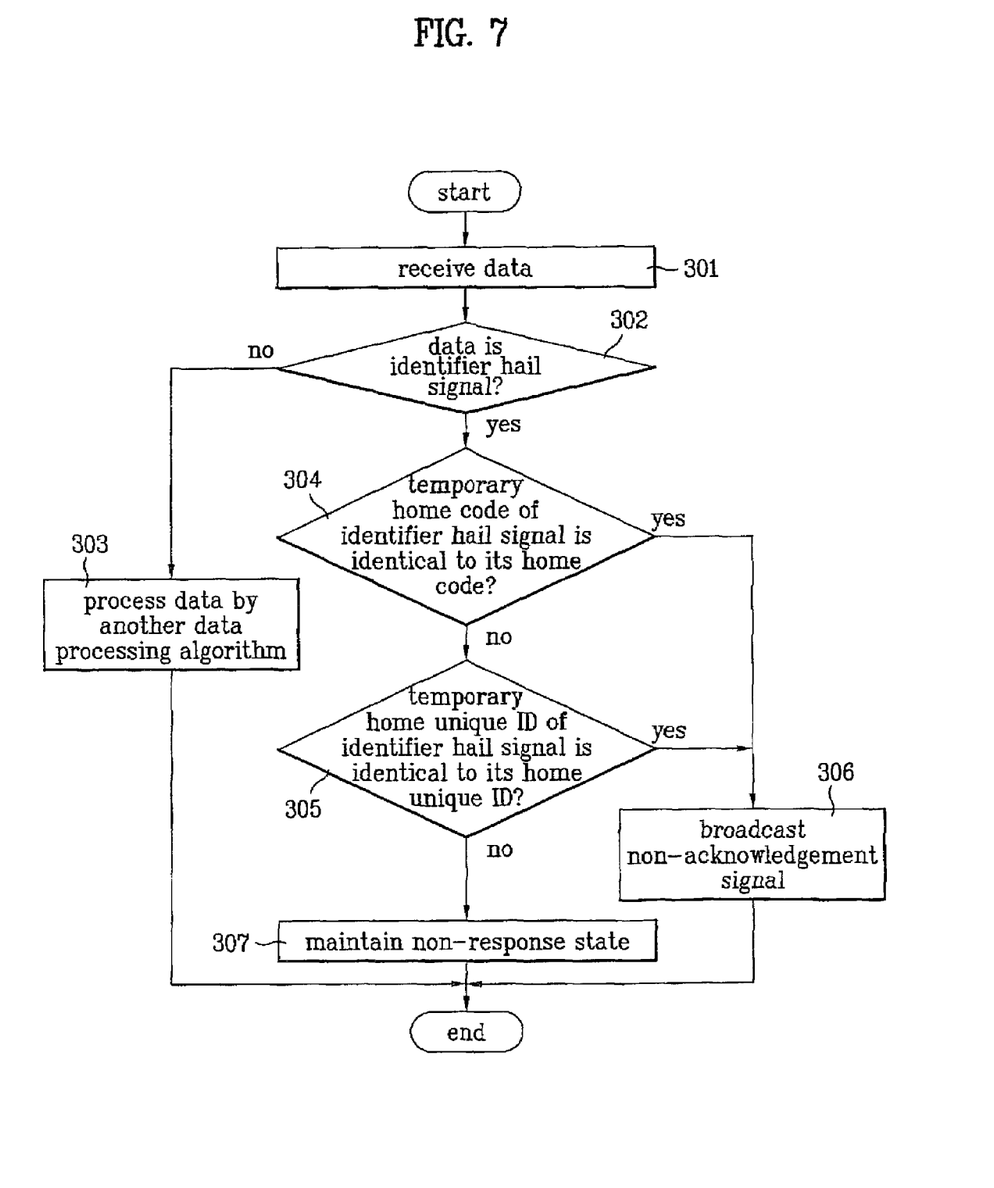
FIG. 7 illustrates a process flowchart by which nodes prevent identifier overlap when the node shown in FIG. 3 sets up a subnet.
Figure 9:
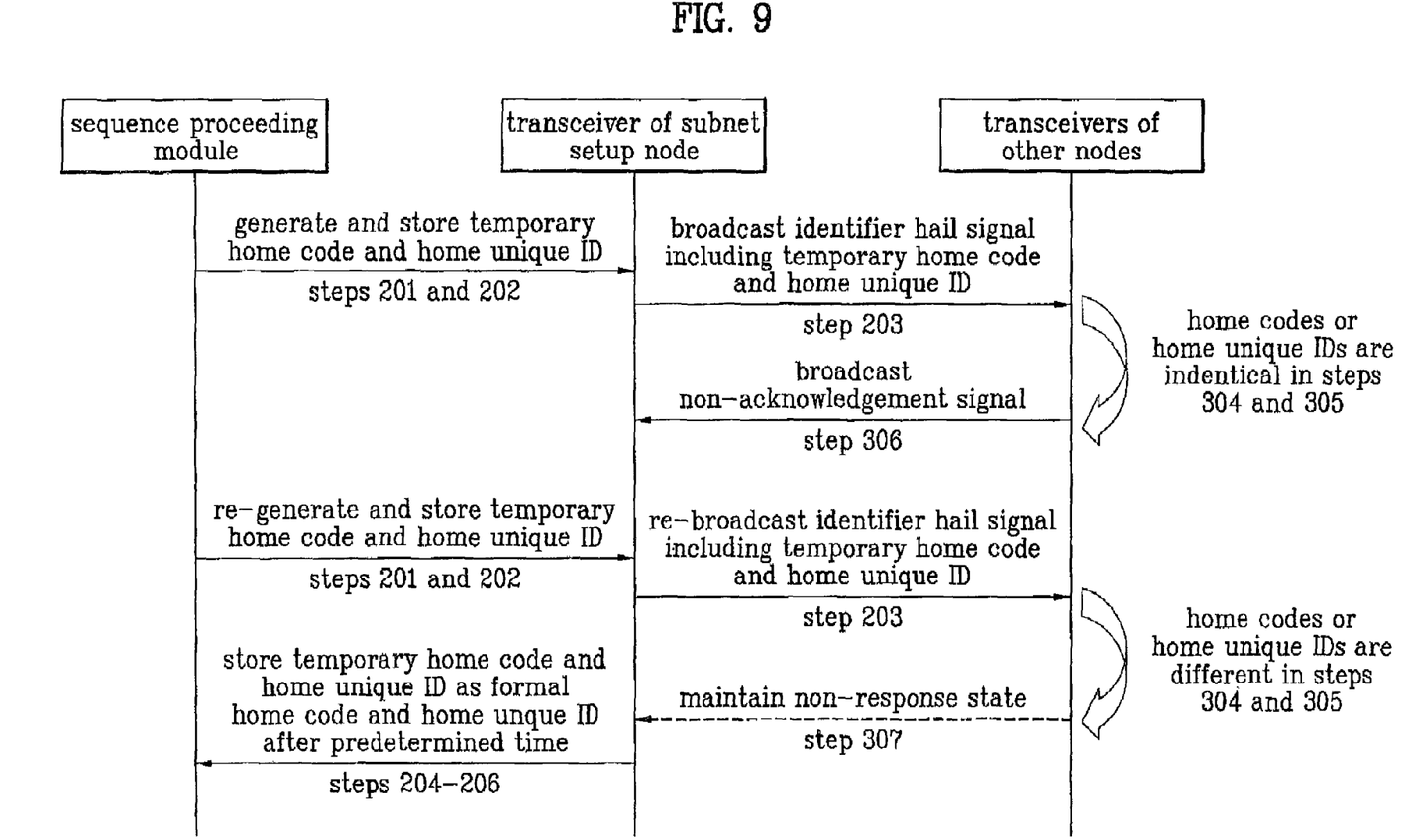
FIG. 9 illustrates a time series sequence map of data processing sequences on the communication network shown in FIG. 1 when the processes shown in FIGS. 6 to 8 are performed.

FIG. 6 illustrates a process flowchart by which a node sets up a subnet on a communication network. FIG. 7 illustrates a process flowchart by which nodes prevent identifier overlap when a node sets up a subnet. FIG. 9 illustrates a time series sequence map of data processing sequence between the transceiver of a node of a subnet to be created and transceivers of the existing nodes that have already been created.

A subnet may be created where no subnet has been previously formed (e.g., a subnet may be created when node 111 connects for the first time to a power line of the house, when a node connected to a power line does not have a transceiver and thus fails to be able to communicate with other electronic appliances and thus fails to serve as a node, when other nodes have been connected to the power line of the house but are not able to create a subnet, etc.) or when a new subnet needs to be created to replace an older, pre-existing subnet.

The starting means 122 may be provided as a program that automatically starts directly after power is connected to the node 111. Alternatively, the starting means 122 may be provided as a 'start' switch activated by a user.

Referring to FIG. 6, when the subnet creation process starts, the identifier generating means 123 generates a first identifier type called a home code and stores it in the identifier storing means 127 as a temporary home code (step 201). In one aspect of the present invention, the home code is composed of a predetermined number of digits or letters and may be provided by various methods. For example, a user may select one of a plurality of home code groups stored in memory or the any of the home code groups may be generated using a random number generating means.

After generating the home code, the identifier generating means 123 generates a second identifier type called a unique home ID, and stores it in the identifier storing means 127 as a temporary unique home ID (step 202). In one aspect of the present invention, the unique home ID is composed of a predetermined number of digits or letters. The unique home ID can be generated in various methods similar to the generation of the home code. For example, the unique home ID may be generated by adding a specific ID related to the node 111 to the generated home code, selecting one of a plurality of unique home ID groups stored in memory, or using a random number generating means. In one aspect of the present invention, the specific ID of the node 111 may generally include the product serial number of the appliance, but may also be composed of a predetermined number of digits or letters identically to the home code or unique home ID.

After the temporary home code and temporary unique home ID are generated and stored, the transceiver 124 of the node 111 broadcasts an identifier hail signal (step 203). In one aspect of the present invention, a header of the data packet includes information identifying the broadcasted signal as an identifier hail signal.

The node 111 broadcasting the identifier hail signal maintains a standby state for a predetermined time (step 204) and determines whether a non-acknowledgement signal has been received from any nodes outside subnets on the communication network and within the open communication range (step 205).

Referring to FIG. 7, the identifier hail signal is broadcasted by the node 111 to all nodes of subnets connected to the power line within open communication range (step 301). The nodes receiving the broadcasted identifier hail signal (i.e., receiving nodes) analyze, for example, the header of the broadcasted data packet and determine whether the data packet includes an identifier hail signal (step 302). In one aspect of the present invention, each of the receiving nodes includes a determining means for determining whether the data received through the communication network is an identifier hail signal. If it is determined that the data packet does not include an identifier hail signal, the receiving node processes the data packet according to a data processing algorithm (step 303). If it is determined that the data packet does include the identifier hail signal, the receiving node determines whether the temporary home code included within the broadcasted signal is identical to its own home code (step 304). If it is determined that broadcasted home code is identical to the home code of the receiving node, the receiving node responds to the broadcast by transmitting a non-acknowledgement signal through the transceiver (step 306). If it is determined that the broadcasted home code is not identical to the home code of the receiving node, the receiving node determines whether the temporary unique home ID included within the broadcasted signal is identical to its own unique home ID (step 305). If it is determined that the broadcasted unique home ID is identical to unique home ID of the receiving node, the receiving node responds to the broadcast by transmitting a non-acknowledgement signal through the transceiver (step 306). If it is determined that the broadcasted unique home ID is not identical to the unique home ID of the receiving node, the receiving node maintains a non-responsive state (step 307) and does not respond to the broadcasted identifier hail signal.

In one aspect of the present invention, not all the nodes within the open communication range on the communication network need to be able to perform the processes of steps 304 to 307 of FIG. 7. Not all nodes within the open communication range on the communication network need to have the ability to respond to the broadcasted identifier hail signal. Accordingly, at least one node within each subnet may be provided with the ability to respond to a broadcasted identifier hail signal. For example, at least one of the nodes within each subnet may be provided with such ability as long as power is supplied to that subnet.

While it has been described that the receiving nodes first compare the broadcasted home codes followed by the unique home IDs, the receiving nodes are not necessarily limited to the process illustrated in FIG. 7. Accordingly, in one aspect of the present invention, broadcasted home codes may be compared by the receiving nodes after the broadcasted unique home IDs have been compared. In another aspect of the present invention, the broadcasted home codes and unique home IDs may be compared by the receiving nodes simultaneously.

Figure 8:
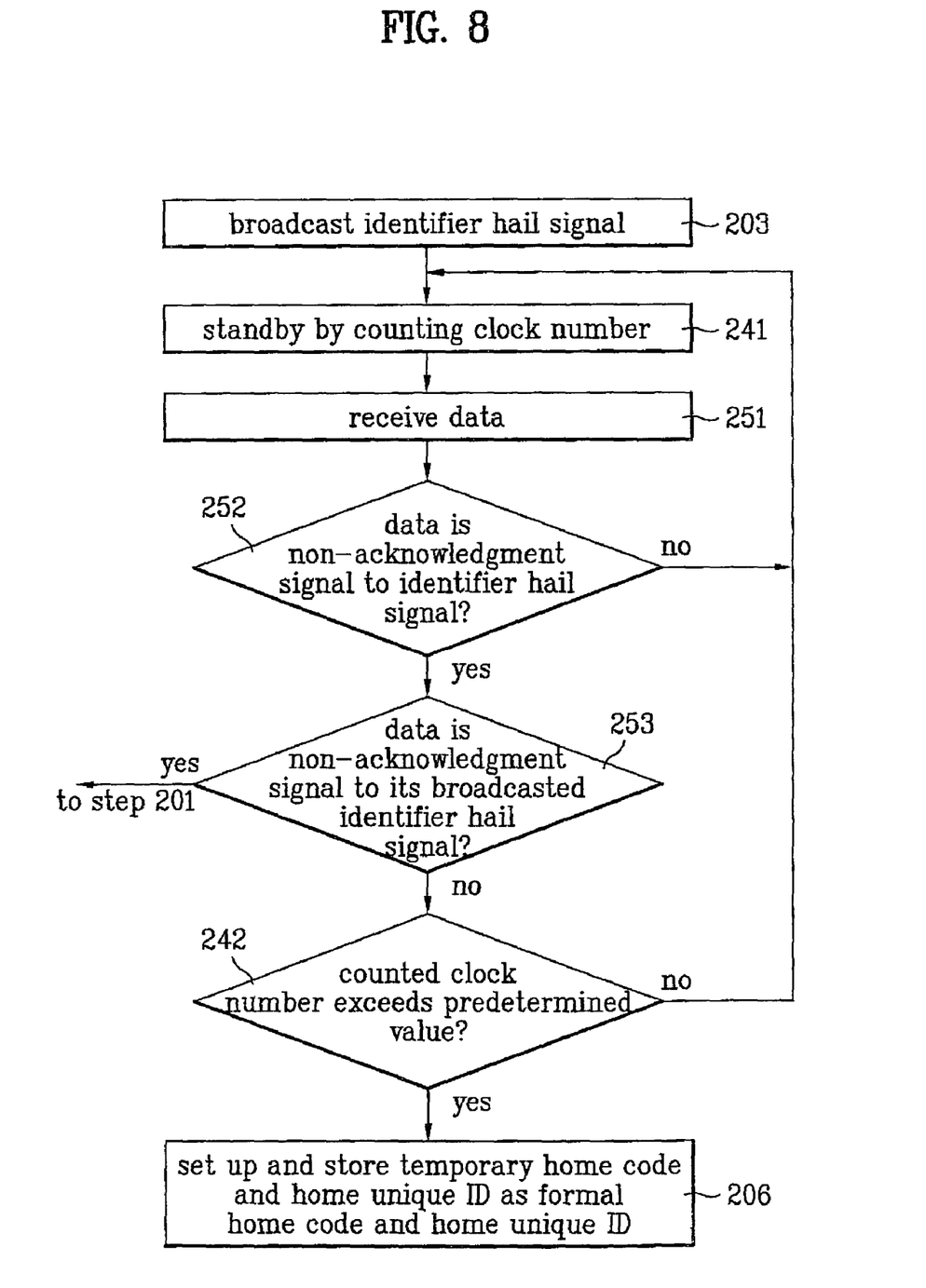
FIG. 8 illustrates a flowchart showing a portion of the process shown in FIG. 6.

FIG. 8 illustrates a detailed flowchart of the processes of steps 204 and 205 exemplified in FIG. 6.

Referring to FIG. 8, after broadcasting the identifier hail signal (step 203), node 111 counts a number of clock signals (step 241). Accordingly, the node 111 includes a means for generating clock signals in unit times or receiving external clock signals through the communication network. When the node 111 receives a data packets broadcasted over communication network (step 251), the node 111 analyzes the header of the received data packet and determines whether the data packet includes the non-acknowledgement signal transmitted in response to its broadcasted identifier hail signal (step 252). If it is determined that the data packet does not include any non-acknowledgement signal, node 111 ignores the data packet and maintains the standby state (step 241). If it is determined that the data packet does include a non-acknowledgement signal, node 111 determines whether the received data packet includes the non-acknowledgement signal transmitted in response to its broadcasted identifier hail signal (step 253).

In one aspect of the present invention, the header of the data packet preferably includes information notifying the presence of a non-acknowledgement signal transmitted in response to the broadcasted identifier hail signal. Additionally, the temporary home code and the temporary unique home ID of the node responding to the broadcasted identifier hail signal are located in first predetermined portions of the transmitted non-acknowledgement signal and the temporary home code and the temporary unique home ID of node 111 are located in second predetermined portions of the transmitted non-acknowledgement signal.

Accordingly, when node 111 receives a data packet which includes the non-acknowledgement signal transmitted in response to the broadcasted identifier hail signal (step 252), the microprocessor 121 of the node 111 compares the temporary home code and the temporary unique home ID located in the second portions of the transmitted non-acknowledgement signal with the temporary home code and the temporary unique home ID stored in the identifier storing means 127 (step 253). If it is determined that the two sets of temporary home codes and temporary unique home IDs are identical, the node 111 determines that the data packet includes the non-acknowledgement signal transmitted in response to its broadcasted identifier hail signal, returns to the beginning of the process flow illustrated in FIG. 6, and commands the identifier generating means 123 to generate a new, different, home code and unique home ID. Accordingly, the identifier generating means 123 generates the home code and unique home ID and stores them in the identifier storing means 127 as the new temporary home code and the temporary unique home ID (steps 201 and 202) and succeeding processes are performed as described above. If it is determined that the two home codes are not identical, node 111 waits to receive a non-acknowledgement signal in response to its broadcasted identifier hail signal. The aforementioned procedure may be repeatedly performed as required until node 111 fails to receive a non-acknowledgement signal in response to its broadcasted signal.

If it is determined that the two sets of temporary home codes and temporary unique home IDs are not identical, the node 111 determines that it did not receive the non-acknowledgement signal transmitted in response to its broadcasted identifier hail signal and when the number of the clock signals counted in step 242 exceeds a predetermined value, the above described broadcasting/comparing procedure is finished.

Accordingly, when node 111 fails to receive the non-acknowledgement signal transmitted in response to its broadcasted signal within the predetermined period of time, node 111 determines that the nodes of the subnets on the communication network within the open communication range are not represented by its generated temporary home code and temporary unique home ID. Accordingly, node 111 stores the temporary home code and temporary unique home ID as a formal home code and formal unique home ID in the identifier storing means 127 (step 206).

Referring to FIG. 9, the data processing sequences for subnet creation between nodes of subnets distributed on the communication network may be temporally diagrammed. It should be recognized that the sequence proceeding modules of FIG. 9 represent hardware and software means for processing data in node 111 (or other node responsible for creation of a subnet) according to the principles of the present invention.

In one aspect of the present invention, the home code may be included in the data packet which the node 111 broadcasts. While the broadcasted data packet reaches the nodes of all subnets connected to the communication network within the open communication range, only nodes of other subnets having the same home codes receive a command or information from the broadcasted data packet. Accordingly, the unique home ID is not included in all the data packets broadcasted by node 111. Rather, the unique home ID is only broadcasted in data packets including a specific command or information.

The unique home ID may be used to automatically detect and regulate home code overlap of the subnets existing within different control ranges of the open communication range.

When home codes are modified due to home code overlap, the unique home ID may be used as it is except when a new subnet is created or unique home ID overlap is detected.

When a node (e.g., electronic appliance) of a subnet is intended to be transferred to a different pre-existing subnet in a new location (e.g., new open communication range) or to create a new subnet in the same location, the node must be initialized to delete any pre-existing home code, unique home ID or other address stored in the identifier storing means 127 and start the above-described subnet setup sequence. Accordingly, each of the nodes within the subnets includes a reset switch capable of performing the aforementioned initialization procedure.

According to the principles of the present invention, the subnets may use lower significance addresses such as area codes or group codes, uniformly provided to nodes and divided into areas or groups, according to the area and correlation of the subnet. A lower significance address creation sequence may be provided similar to the above described subnet creation sequence. In one aspect of the present invention, the home code or unique home ID may be included in the data packet broadcasted by and to nodes located in predetermined areas or groups so that nodes in subnets located outside the predetermined areas or groups cannot respond to the broadcasted signal.

In accordance with the principles of the present invention, any transmission method (e.g., frequency division or time division) may be used allowing the nodes to communicate with each other. Further, each of the nodes may include or in a separate communication module for providing information in data packets according to any transmission type, or encoding/decoding means for encoding/decoding data transmissions in any desired format.

While it has been described that each node may include a transceiver 124, an identifier generating means 123, an identifier storing means 127 and microprocessor 121, it is recognized that each of the nodes may comprise other components allowing the above described communication regulation to be performed. For example, the transceiver 124 may be provided as a communication module including the starting means 122, the identifier generating means 123, the comparing means 125, the identifier setup means 126, the identifier storing means 127, the microprocessor 121 to control the original function of the appliance or the microprocessor 121 may be used to control the communication functions of the appliance while other means such as a separate communication module, encoding means, and/or the decoding means may be used to process transmitted data. Additionally, the transceiver of each node may include a subnet identifying means for identifying a subnet to which a response to the node broadcasting the data packet belongs based on at least one of the aforementioned identifiers (e.g., home code, unique home ID, etc.).

In one aspect of the present invention, the communication network may be provided within a communications medium such as a power line, telephone line, cable, or any other medium through which data may be broadcasted.

In accordance with the principles of the present invention, when the node of the subnet transmits data in the broadcasting method, it does not interfere with other subnets existing within the open communication range. Moreover, home code overlap generated after the subnet setup may be easily detected and regulated in its early stage on the communication network.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A communication network including at least one subnet, wherein said at least one subnet includes at least one node, said at least one node comprising:
    an identifier generating means for generating at least two types of identifiers, said at least two types of identifiers identifying said at least one subnet;
    an identifier storing means for storing said at least two types of identifiers;
    a transceiver for broadcasting at least one of said at least two types of identifiers within a data packet to said at least one subnet; and
    a subnet identifying means for identifying the subnet to which a node broadcasting said data packet belongs according to at least one of the two types of identifiers received within said broadcasted data packet.

2. The communication network according to claim 1, wherein said at least two types of identifiers comprise a first identifier and a second identifier, said first identifier comprising a home code and said second identifier comprising a unique home ID.

3. The communication network according to claim 1, further comprising an open communication medium, wherein the at least one subnet is connected to the communication network via the open communication medium.

4. The communication network according to claim 3, wherein the open communication medium comprises a power line.

5. A subnet comprising at least one node, comprising:
    an identifier generating means for generating at least two types of identifiers, said at least two types of identifiers identifying said at least one subnet;
    an identifier storing means for storing said at least two types of identifiers;
    a transceiver for broadcasting at least one of said at least two types of identifiers within a data packet to said at least one subnet; and
    a subnet identifying means for identifying the subnet to which a node broadcasting said data packet belongs according to at least one of the two types of identifiers received within said broadcasted data packet.

6. The subnet according to claim 5, wherein said at least two types of identifiers comprise a home code and a unique home ID.

7. A network of electronic appliances in communication with each other via an open communication medium, comprising:
    an identifier generating means for generating at least two types of identifiers;
    a transceiver for broadcasting an identifier hail signal over a communication network, said identifier hail signal including said at least two types of identifiers;
    a comparing means for comparing said at least two types of identifiers included in the identifier hail signal with corresponding identifiers identifying a home subnet;
    identifier setup means for generating identifiers acknowledged as unique by nodes of outside subnets on the communication network; and
    an identifier storing means for storing the generated identifiers, wherein said transceiver broadcasts a non-acknowledgement signal over the communication network when identifiers included in said identifier hail signal are identical to identifiers of its home subnet, said identifier generating means newly generates at least two types of identifiers when said transceiver receives a non-acknowledgement signal, and said transceiver broadcasts said identifier hail signal including said newly generated at least two types of identifiers over said communication network.

8. The network according to claim 7, wherein said transceiver maintains a non-responsive state when all the identifiers received within an identifier hail signal are different from said identifiers identifying its home subnet, and when said transceiver does not receive a non-acknowledgement signal within a predetermined amount of time after broadcasting said identifier hail signal, said identifier setup means determines that the identifiers within the broadcasted identifier hail signal do not identify outside subnets on the communication network, and generates said broadcasted identifiers as formal identifiers of its home subnet.

9. The network according to claim 7, further comprising a determining means for determining whether a received data packet includes an identifier hail signal.

10. The network according to claim 7, wherein said open communication medium comprises a power line.

11. A communication module of a subnet on a communication network, comprising:
    an identifier generating means for generating at least two types of identifiers;

a transceiver for broadcasting an identifier hail signal over the communication network, said identifier hail signal including said at least two types of identifiers;

a comparing means for comparing said at least two types of identifiers included in the identifier hail signal with corresponding identifiers identifying a home subnet;

an identifier setup means for generating identifiers acknowledged as unique by nodes of outside subnets on the communication network; and an identifier storing means for storing the generated identifiers, wherein said transceiver broadcasts a non-acknowledgement signal over the communication network when identifiers included in said identifier hail signal are identical to identifiers of its home subnet, said identifier generating means newly generates at least two types of identifiers when said transceiver receives a non-acknowledgement signal, and said transceiver broadcasts said identifier hail signal including said newly generated at least two types of identifiers over said communication network.

12. The module according to claim 11, wherein said transceiver maintains a non-responsive state when all the identifiers received within an identifier hail signal are different from said identifiers identifying its home subnet, and when said transceiver does not receive a non-acknowledgement signal within a predetermined amount of time after broadcasting said identifier hail signal, said identifier setup means determines that the identifiers within the broadcasted identifier hail signal do not identify outside subnets on the communication network, and generates said broadcasted identifiers as formal identifiers of its home subnet.

13. The module according to claim 11, further comprising a determining means for determining whether a received data packet includes an identifier hail signal.

14. The module according to claim 11, wherein said open communication medium comprises a power line.

15. A method for creating a subnet on a communication network, comprising:

starting a subnet creation sequence, generating at least two types of identifiers;

storing said generated identifiers as temporary identifiers for identifying a newly created subnet;

broadcasting an identifier hail signal over said communication network, said identifier hail signal including at least two types of temporary identifiers;

determining whether a non-acknowledgement signal transmitted in response to the broadcasted identifier hail signal is received within a predetermined amount of time;

repeating the generating of said at least two identifiers upon receipt of said non-acknowledgement signal; and storing said temporary identifiers as formal identifiers for identifying the newly created subnet when a non-acknowledgement signal is not received within a predetermined amount of time.

16. The method according to claim 15, wherein the determining comprises:

(a) counting a number of clock signals and maintaining a standby state;

(b) determining whether a received data packet includes a non-acknowledgement signal;

(c) determining whether the received data packet includes a non-acknowledgement signal transmitted in response to the broadcasted identifier hail signal, when it is determined that the received data includes a non-acknowledgement signal; and (d) determining whether the number of clock signals counted during the standby state exceeds a predetermined value when it is determined that the received data packet does not include the non-acknowledgement signal transmitted in response to its broadcasted identifier hail signal in the second determining step, wherein when the result of (b) or (d) is negative, the method from the standby state is repeated, when the result of (c) is positive, the method from the generating said at least two types of identifiers is repeated, and when the result of (d) is positive, the method advances to storing the temporary identifiers as formal identifiers.

17. The method according to claim 15, wherein said at least two types of identifiers includes home code and a unique home ID.

18. The method according to claim 15, wherein said subnet comprises at least one node connected to the communication network via an open communication medium.

19. The method according to claim 18, wherein said open communication medium comprises a power line.

20. A method for preventing creation of a subnet having the same identifier as a pre-existing subnet, wherein a node of either subnet is identifiable by at least two types of identifiers, comprising:

determining whether a received data packet includes an identifier hail signal;

determining whether any of the identifiers included within the identifier hail signal are identical to the identifiers of the pre-existing subnet, when it is determined that the received data packet includes an identifier hail signal;

broadcasting a non-acknowledgement signal when any of the identifiers included within the identifier hail signal are identical to the identifiers of the pre-existing subnet; and maintaining a non-responsive state by the pre-existing subnet when all of the identifiers included within the identifier hail signal are different from the identifiers of the pre-existing subnet.

21. The method according to claim 20, wherein the at least two kinds of identifiers includes home code and a unique home ID.

22. The method according to claim 20, wherein the subnets are connected to a communication network via an open communication medium.

23. The method according to claim 22, wherein said open communication medium comprises a power line.

* * * * *